United States Patent [19]

Kitagawa

[11] Patent Number: 5,152,650
[45] Date of Patent: Oct. 6, 1992

[54] ELECTRICALLY CONDUCTIVE SYNTHETIC RESIN BOLT

[75] Inventor: Hiroji Kitagawa, Nagoya, Japan

[73] Assignee: Kitagawa Industries Co., Ltd., Japan

[21] Appl. No.: 673,280

[22] Filed: Mar. 21, 1991

[30] Foreign Application Priority Data

Jun. 4, 1990 [JP] Japan ................... 2-145848

[51] Int. Cl.⁵ .................. F16B 35/04; F16B 39/02
[52] U.S. Cl. ..................... 411/82; 411/424; 411/901; 411/908
[58] Field of Search .............. 411/82, 258, 301, 411, 411/424, 901-903, 908; 10/27 R

[56] References Cited

U.S. PATENT DOCUMENTS

| | | | |
|---|---|---|---|
| 4,478,544 | 10/1984 | Strand | 411/908 |
| 4,687,394 | 8/1987 | Berecz | 411/908 |
| 4,687,398 | 8/1987 | Berecz | 411/908 |
| 4,718,801 | 1/1988 | Berecz | 411/908 |
| 4,810,419 | 3/1989 | Kunimoto et al. | |
| 4,859,128 | 8/1989 | Berecz et al. | 411/908 |
| 4,863,330 | 9/1989 | Olez et al. | 411/908 |
| 4,909,690 | 3/1990 | Gapp et al. | 411/908 |
| 4,975,006 | 12/1990 | Swanson | 411/908 |
| 5,000,636 | 3/1991 | Wallace | 411/301 |
| 5,033,925 | 7/1991 | Moghe | 411/908 |

FOREIGN PATENT DOCUMENTS

| | | |
|---|---|---|
| 0166134 | 6/1984 | European Pat. Off. . |
| 0200400 | 11/1986 | European Pat. Off. . |
| 0254481 | 1/1988 | European Pat. Off. . |
| 1354351 | 5/1974 | United Kingdom . |
| 1380120 | 1/1975 | United Kingdom . |
| 1557762 | 12/1979 | United Kingdom . |
| 2167513A | 5/1986 | United Kingdom . |
| 2167514A | 5/1986 | United Kingdom . |
| 2205374A | 12/1988 | United Kingdom . |

Primary Examiner—Neill R. Wilson
Attorney, Agent, or Firm—Davis, Bujold & Streck

[57] ABSTRACT

A tightening member molded from hard synthetic resin containing carbon fiber developed from hyperfine particles of a high-melting metal and/or a compound of the high-melting metal by use of vapor phase system for thermally decomposing hydrocarbon. The tightening member effectively prevents electrification of static electricity due to its high conductivity given by the carbon fiber and is bestowed with mechanical properties such as tensile strength.

17 Claims, 1 Drawing Sheet

ELECTRICALLY CONDUCTIVE SYNTHETIC RESIN BOLT

BACKGROUND OF THE INVENTION

This invention relates to a conductive tightening member molded from synthetic resin.

Conventionally, a tightening member molded from hard synthetic resin such as nylon is put in a tapped hole of a machine element to fix the machine element, because the synthetic resin tightening member is easily and cheaply manufactured and light in weight.

As is generally known, synthetic resin is an insulator and is prone to be electrified with static electricity. Therefore, the synthetic resin tightening member, when utilized in a copying machine or the like, sometimes suffers from electrification as a result of static electricity caused by friction so that the copying machine operates incorrectly. To solve this problem, a tightening member molded from synthetic resin containing conductive material such as carbon black and metallic particles has been created.

Although a tightening member molded from synthetic resin containing carbon black has low electric resistivity and can prevent electrification by static electricity, the amount of carbon black has an upper limit because the mixed carbon black deteriorates mechanical properties such as the strength of the synthetic resin.

Moreover, even when the amount of carbon black is below the upper limit, a slight increase of the amount of carbon black sharply reduces the volume resistivity of synthetic resin when the volume resistivity is between $10^{10}$ $\Omega$·cm and $10^3$ $\Omega$·cm, where the synthetic resin containing carbon black most effectively prevents electrification by static electricity. Therefore, it is quite difficult to mix carbon black in the synthetic resin such that volume resistivity is set at the optimum value between $10^{10}$ $\Omega$·cm and $10^3$ $\Omega$·cm.

On the other hand, the problem of a tightening member molded from synthetic resin containing metallic particles is that the metallic particles are prone to being unevenly dispersed in the synthetic resin because the metallic particles and the synthetic resin are not compatible with each other and their specific gravities are quite different. The molded tightening member thus has an uneven volume resistivity and, accordingly, cannot effectively prevent electrification by static electricity.

SUMMARY OF THE INVENTION

Wherefore, it is an object of the present invention to provide a tightening member molded from synthetic resin which can effectively prevent electrification by static electricity and in which the mechanical properties of the synthetic resin are not deteriorated.

Other objects and benefits of the invention will become apparent from the detailed description which follows hereinafter when taken in conjunction with the drawing figures which accompany it.

This object is achieved by a tightening member molded from hard synthetic resin containing carbon fiber, wherein the carbon fiber is developed from hyperfine particles of a high-melting metal and/or a compound of the high-melting metal obtained by a vapor phase system for thermally decomposing hydrocarbon.

The carbon fiber is shaped in a whisker having a microdiameter and has a high affinity with polymeric materials, superior mechanical properties including tensile strength, and high electric conductivity. When a tightening member is molded from hard synthetic resin containing the carbon fiber, the carbon fibers are uniformly dispersed and interlaced with each other in the synthetic resin. The carbon fiber thus endows the tightening member with enough conductivity to prevent electrification by static electricity and improves the mechanical properties of the tightening member.

The degree of conductivity, namely electric resistivity, is determined by the amount of the carbon fiber mixed in the synthetic resin. This is because the more carbon fibers that are contained in the synthetic resin, the more frequently the carbon fibers contact each other. The tightening member can be provided with desired electric resistivity by adjusting the amount of the carbon fiber according to the position where the tightening member is utilized.

Among various synthetic resins, nylon resin has the most preferable mechanical properties, including strength and elasticity, as a base material for the tightening member of the present invention.

BRIEF DESCRIPTION OF THE DRAWINGS

By way of example and to make the description clearer, reference is made to accompanying drawings in which.

DETAILED DESCRIPTION OF PREFERRED EMBODIMENTS

Hereinafter, embodiments of the present invention are described with reference to the drawings.

Figure 1:
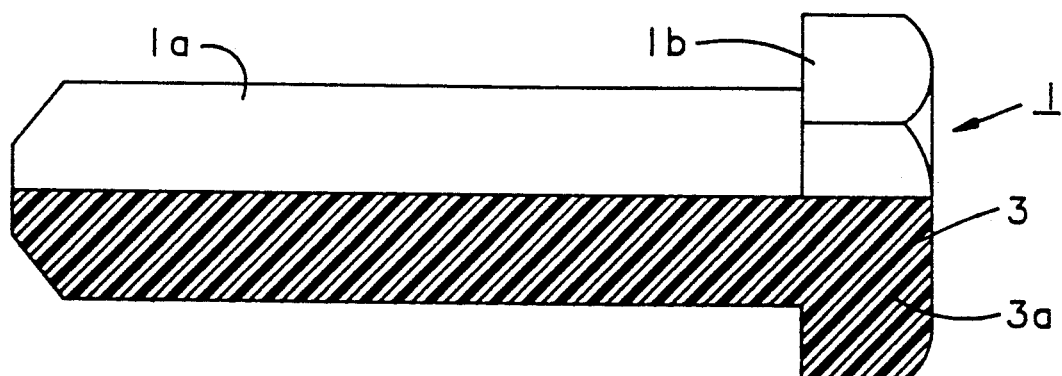
FIG. 1 is a partial cross-sectional view of a tightening member of a first embodiment.

FIG. 1 is a partial cross-sectional view of a hexagon head bolt 1 embodying the present invention. The bolt 1 is molded from nylon resin 3 containing 8% by volume of carbon fiber 3a, and comprises a pillar-shaped screw portion 1a provided with screw threads (not shown) and a hexagon head 1b shaped to be caught by a tool such as a wrench. The screw thread is engaged with a tapped hole of a machine element such as a hexagon nut when the screw portion 1a is inserted into the tapped hole by rotating the hexagon head 1b.

The carbon fiber 3a is developed from iron particles having a particle diameter of 0.02 μm through 0.03 μm by use of a vapor phase system for thermally decomposing benzene in a furnace of 950° C. through 1300° C. The diameter and length of the carbon fibers 3a are 0.1 μm through 0.5 μm and 0.1 mm through 1 mm, respectively. Other properties of the carbon fiber 3a is as follows:

tensile strength: 200 kg/mm$^2$
elastic modulus: 20 t/mm$^2$
electric resistivity: 0.0001 $\Omega$·cm
specific gravity: 1.86

Since having a specific gravity of 1.86 and higher affinity with various synthetic resins (including nylon resin) than those of metallic particles and carbon black, the carbon fiber 3a is uniformly dispersed all through the nylon resin 3 composing the bolt 1. Since the bolt 1 has uniform and low volume resistivity of $10^5$ $\Omega$·cm through $10^8$ $\Omega$·cm, the bolt 1 can effectively prevent electrification by static electricity at its surface. An apparatus in which the bolt 1 is utilized is, therefore, protected from adverse effects caused by static electricity on the bolts used in its assembly.

In addition, the bolt 1, which is molded from the nylon resin 3 containing the above-mentioned carbon fiber 3a, is endowed with various superior mechanical properties. In particular, the tensile strength of the bolt 1 is higher than a bolt molded only from nylon resin. The bolt 1 is provided with high durability and can be utilized for various purposes.

As mentioned above, to improve electrical conductivity the resin of the bolt 1 could be mixed with carbon black. However, as also mentioned above, a given amount of carbon black would dispersed in the resin of the bolt 1 differently throughout according to the way the carbon black is mixed. Therefore, optimum volume resistivity of the bolt 1 cannot be obtained by regulating the amount of the carbon black. On the other hand, the fiber length of the carbon fiber 3a employed in this invention is almost the same as linked particles of carbon black. Every time a given amount of carbon fiber 3a is mixed in the nylon resin 3 of the bolt 1, the carbon fiber 3a is dispersed in a homogeneous condition and the volume resistivity of the bolt 1 is fixed. Accordingly, the volume resistivity of the nylon resin 3 can be set at its optimum value by regulating the amount of the carbon fiber 3a.

Figure 2:
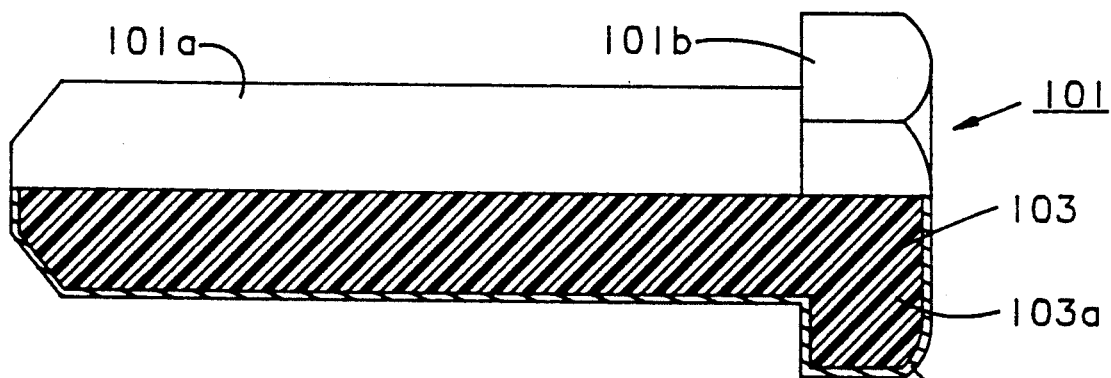
FIG. 2 is a partial cross-sectional view of a tightening member of a second embodiment.

Another bolt 101 according to a second embodiment of the present invention, shown in FIG. 2, is molded from nylon resin 103 containing carbon fiber 103a, as in the bolt 1 of the first embodiment, and a metallic layer 105 is formed on the surface of the bolt 101 using, for example, metal plating, barrel plating, electroless plating, or vacuum evaporation. The bolt 101 effectively shields electromagnetic wave noise because the metallic layer 105 gives high electrical conductivity to the bolt 101.

Figure 3:
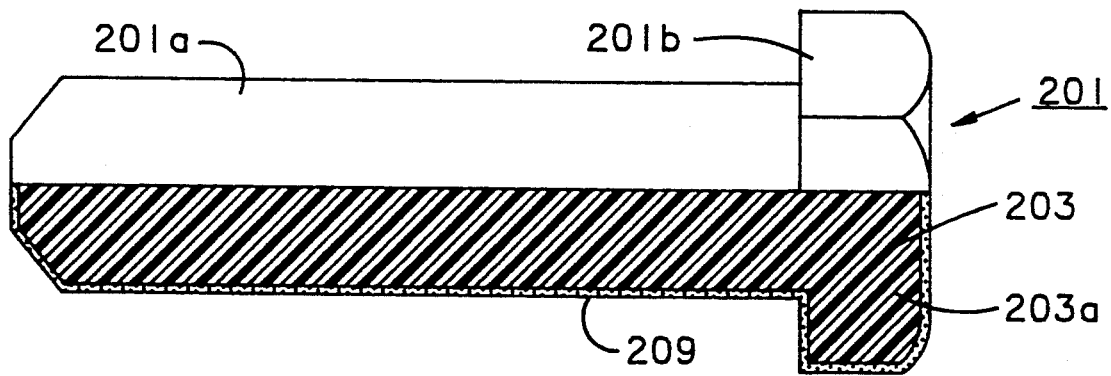
FIG. 3 is a partial cross-sectional view of a tightening member of a third embodiment.

Still another bolt 201 according to a third embodiment, shown in FIG. 3, is also similar to the bolt 1 of the first embodiment. Specifically, the bolt 201 is molded from nylon resin 203 containing carbon fiber 203a and comprises a screw portion 201a and a hexagon head 201b. On the surface of the screw portion 201a of the bolt 201, adhesive material 209 is applied so as to prevent the bolt 201 from easily coming out of a tapped hole (not shown) into which it has been inserted.

As described above, a tightening member of the present invention is molded from synthetic resin containing carbon fibers developed from hyperfine particles of a high-melting metal and/or a compound of the high-melting metal obtained by a vapor phase system for thermally decomposing hydrocarbon. The tightening member endowed with high electrical conductivity by the carbon fibers can effectively prevent electrification by static electricity and has superior mechanical properties including tensile strength.

What is claimed is:

1. An electrically conductive fastener formed of hard synthetic resin and containing carbon fibers dispersed uniformly therethrough, the carbon fiber being developed from iron particles having a particle diameter of 0.02 $\mu$m through 0.03 $\mu$m by the use of a vapor phase system for thermally decomposing benzene in a furnace at 950° C. through 1300° C., the diameter and length of the carbon fibers being from about 0.1 $\mu$m to about 0.5 $\mu$m and from about 0.1 mm to about 1 mm, respectively whereby the resin containing carbon fiber of the fastener has a low volume resistivity of from about $10^5$ $\Omega$·cm to about $10^8$ $\Omega$·cm.

2. The fastener of claim 1 wherein:
said carbon fibers are obtained from hyperfine particles of a high-melting metal.

3. The fastener of claim 1 wherein the tightening member comprises a head portion and a body portion and additionally comprising:
a metal surface disposed on said body portion to improve the electrical conductivity qualities thereof.

4. The fastener of claim 1 wherein the tightening member comprises a head portion and a body portion and additionally comprising:
an adhesive surface disposed on said body portion to improve the resistance of said body portion to coming out of a hole into which it is placed.

5. The fastener of claim 1 wherein:
said carbon fibers are shaped as whiskers having a microdiameter and a high affinity with polymeric materials.

6. The fastener of claim 1 wherein:
said carbon fibers are obtained from iron particles having a particle diameter of 0.2 $\mu$m through 0.03 $\mu$m by use of a vapor phase system for thermally decomposing benzene in a furnace of 950° C. through 1300° C.

7. In a fastener formed of hard synthetic resin and containing carbon therein to add resistive conductance thereto to eliminate the buildup of static electricity thereon, the improvement to increase the mechanical qualities of the tightening member comprising:
the carbon being in the form of fibers dispersed uniformly through the resin, the carbon fiber being developed from iron particles having a particle diameter of 0.02 $\mu$m through 0.03 $\mu$m by the use of a vapor phase system for thermally decomposing benzene in a furnace at 950° C. through 1300° C., the diameter and length of the carbon fibers being from about 0.1 $\mu$m to about 0.5 $\mu$m and from about 0.1 mm to about 1 mm, respectively whereby the resin containing carbon fiber of the fastener has a low volume resistivity of from about $10^5$ $\Omega$·cm to about $10^8$ $\Omega$·cm.

8. The improvement to a fastener of claim 7 wherein:
said carbon fibers are obtained from hyperfine particles of a high-melting metal.

9. The improvement to a fastener of claim 7 wherein:
said carbon fibers are a compound of a high-melting metal obtained from a vapor phase system for thermally decomposing hydrocarbon.

10. The improvement to a fastener of claim 7 wherein the tightening member comprises a head portion and a body portion and additionally comprising:
a metal surface disposed on said body portion to improve the electrical conductivity qualities thereof.

11. The improvement to a fastener of claim 7 wherein the tightening member comprises a head portion and a body portion and additionally comprising:
an adhesive surface disposed on said body portion to improve the resistance of said body portion to coming out of a hole into which it is placed.

12. The improvement to a fastener of claim 7 wherein:
said carbon fibers are shaped as whiskers having a microdiameter and a high affinity with polymeric materials.

13. The improvement to a fastener of claim 7 wherein:

said carbon fibers are obtained from iron particles having a particle diameter of 0.02 μm through 0.03 μm by use of a vapor phase system for thermally decomposing benzene in a furnace of 950° C. through 1300° C.

14. A bolt comprising a head portion and a body portion formed of a hard synthetic resin and containing carbon fibers dispersed uniformly therethrough, said carbon fibers being selected from a group comprising carbon fibers obtained from hyperfine particles of a high-melting metal and carbon fibers which are a compound of a high-melting metal obtained from a vapor phase system for thermally decomposing hydrocarbon, the carbon fiber being developed from iron particles having a particle diameter of 0.02 μm through 0.03 μm by the use of a vapor phase system for thermally decomposing benzene in a furnace at 950° C. through 1300° C., the diameter and length of the carbon fibers being from about 0.1 μm to about 0.5 μm and from about 0.1 mm to about 1 mm, respectively whereby the resin containing carbon fiber of the fastener has a low volume resistivity of from about $10^5$ Ω·cm to about $10^8$ Ω·cm.

15. The bolt of claim 14 and additionally comprising:
a metal surface disposed on said body portion to improve the electrical conductivity qualities thereof.

16. The bolt of claim 14 and additionally comprising:
an adhesive surface disposed on said body portion to improve the resistance of said body portion to coming out of a hole into which it is placed.

17. The bolt of claim 14 wherein:
a) said carbon fibers are shaped as whiskers having a microdiameter and a high affinity with polymeric materials;
b) the diameter and length of said carbon fibers are 0.1 μm through 0.5 μm and 0.1 mm through 1 mm, respectively; and,
c) said carbon fibers are obtained from iron particles having a particle diameter of 0.02 μm through 0.03 μm by use of a vapor phase system for thermally decomposing benzene in a furnace of 950° C. through 1300° C.

* * * * *